(12) United States Patent
Werkheiser et al.

(10) Patent No.: US 10,599,882 B1
(45) Date of Patent: Mar. 24, 2020

(54) USING A LAYER PERFORMANCE METRIC (LPM) TO PERFORM PLACEMENT, ROUTING, AND/OR OPTIMIZATION OF AN INTEGRATED CIRCUIT (IC) DESIGN

(71) Applicant: Synopsys, Inc., Mountain View, CA (US)

(72) Inventors: Jason K. Werkheiser, Fogelsville, PA (US); Barry D. Turner, Jr., Leesport, PA (US); Peter F. Jarvis, Kunkletown, PA (US); Christopher M. Smirga, Collegeville, PA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/264,486

(22) Filed: Jan. 31, 2019

Related U.S. Application Data

(60) Provisional application No. 62/625,362, filed on Feb. 2, 2018.

(51) Int. Cl.
  *G06F 17/50* (2006.01)
  *G06F 30/394* (2020.01)
  *G06F 30/30* (2020.01)
  *G06F 119/12* (2020.01)

(52) U.S. Cl.
  CPC ............ *G06F 30/394* (2020.01); *G06F 30/30* (2020.01); *G06F 2119/12* (2020.01)

(58) Field of Classification Search
  CPC .... G06F 30/394; G06F 30/30; G06F 2119/12; G06F 17/5082; G06F 17/5077; G06F 17/5072

USPC ....... 716/113, 108, 122, 129, 139, 134, 136; 703/16

See application file for complete search history.

(56) References Cited

U.S. PATENT DOCUMENTS

| | | | |
|---|---|---|---|
| 6,182,272 B1 | 1/2001 | Andreev et al. | |
| 6,507,938 B1 * | 1/2003 | Roy-Neogi | G06F 30/392 716/113 |
| 7,895,557 B2 | 2/2011 | Alpert et al. | |
| 8,032,855 B1 * | 10/2011 | Ling | G06F 30/392 716/122 |
| 8,370,783 B2 | 2/2013 | Uchino et al. | |
| 8,826,215 B1 | 9/2014 | Alpert et al. | |
| 9,189,591 B2 | 11/2015 | Segal | |
| 9,754,070 B2 | 9/2017 | Segal | |

(Continued)

OTHER PUBLICATIONS

Shanthala et al., "Simultaneous Data Path and Clock Path Engineering Change Order for Efficient Timing Closure in Complex SOC", Journal of VLSI and Signal Processing, vol. 7, Issue 3, Ver. I, May-Jun. 2017, pp. 35-41. (Year: 2017).*

(Continued)

*Primary Examiner* — Phallaka Kik
(74) *Attorney, Agent, or Firm* — Park, Vaughan, Fleming & Dowler LLP; Laxman Sahasrabuddhe

(57) ABSTRACT

Techniques and systems for using a layer performance metric (LPM) during integrated circuit (IC) design are described. Some embodiments can compute an LPM value for at least one timing path in the IC design, wherein the LPM value is equal to a ratio between a wire length of the timing path and a delay of the timing path. Next, the embodiments can use the LPM value of the timing path to perform at least one of placement, routing, or optimization of the timing path.

18 Claims, 3 Drawing Sheets

Compute an LPM value for at least one timing path in the IC design, wherein the LPM value is equal to a ratio between a wire length of the timing path and a delay of the timing path — 502

Use the LPM value of the timing path to perform at least one of placement, routing, or optimization of the timing path — 504

(56) References Cited

U.S. PATENT DOCUMENTS

2006/0225020 A1* 10/2006 Chandrakasan .............................. H03K 19/17736
 716/121
2018/0260507 A1* 9/2018 Zhang ................... G06F 30/394

OTHER PUBLICATIONS

Zhang, "Lecture 12, Tinning Analysis, Part 1", http://classes.engineering.wustle.edu/ese461, Washington University in St. Louis, pp. 1-23. (Year: 2016).*

* cited by examiner

| Layer Bucket | Routing Direction | Layer | RC | MCV µM/pS |
|---|---|---|---|---|
| M10-M12 | Horizontal | M12 | 1.00 | 5.00 |
| | Vertical | M11 | 1.05 | 4.95 |
| | Horizontal | M10 | 1.10 | 4.80 |
| M7-M9 | Vertical | M9 | 2.00 | 4.00 |
| | Horizontal | M8 | 2.00 | 4.00 |
| | Vertical | M7 | 2.00 | 4.00 |
| M5-M6 | Horizontal | M6 | 4.00 | 3.00 |
| | Vertical | M5 | 4.00 | 3.00 |
| M3-M4 | Horizontal | M4 | 8.00 | 2.00 |
| | Vertical | M3 | 8.00 | 2.00 |
| M1-M2 | Horizontal | M2 | 16.00 | 1.00 |
| | Vertical | M1 | 16.00 | 1.00 |

USING A LAYER PERFORMANCE METRIC (LPM) TO PERFORM PLACEMENT, ROUTING, AND/OR OPTIMIZATION OF AN INTEGRATED CIRCUIT (IC) DESIGN

RELATED APPLICATION

This application claims benefit of U.S. Provisional Application Ser. No. 62/625,362, filed on 2 Feb. 2018, the contents of which are herein incorporated by reference in their entirety for all purposes.

BACKGROUND

Technical Field

This disclosure relates to integrated circuits (ICs). More specifically, this disclosure relates to techniques and systems for using a layer performance metric (LPM) to perform placement, routing, and/or optimization of an IC design.

Related Art

Advances in process technology and a practically unlimited appetite for consumer electronics have fueled a rapid increase in the size and complexity of IC designs.

Many silicon manufacturing technologies vary the width and thickness of metal interconnect wires from the bottom to the top of the metal stack. Often, the bottom metal interconnect layer is the narrowest layer and wiring pitch (and hence slowest electrical performance), and the top interconnect layer is the widest layer and pitch (and hence fastest electrical performance).

The varying interconnect widths and wiring pitches affect the physical routability and static timing of the IC design. The physical characteristics of the metal layers make it difficult to predict design success from the placement stage through routing. This is one reason why existing IC design tools and flows can take a long time to converge on an IC design that meets power, area, and timing constraints, and the resulting IC design can be of a poor quality.

Therefore, what are needed are IC design tools without the above-described drawbacks.

SUMMARY

Some embodiments described herein provide techniques and systems for improving IC design. Specifically, embodiments described herein compute an LPM value for at least one timing path in the IC design, wherein the LPM value is equal to a ratio between a wire length of the timing path and a delay of the timing path. Next, the embodiments can use the computed LPM value of the timing path to perform at least one of placement, routing, or optimization of the timing path, thereby producing IC designs that have better performance, manufacturing yield, and/or quality.

In some embodiments, using the LPM value of the timing path to perform at least one of placement, routing, or optimization of the timing path comprises assigning a set of metal layers to a net in the timing path based on the LPM value. Once the set of metal layers is assigned to the net based on the LPM value, the metal layer assignment can be maintained throughout the IC design flow. For example, timing calculations that are performed during placement or optimization of the IC design can use the assigned set of metal layers to calculate timing for the net. Likewise, while routing the IC design, a router can use the assigned set of metal layers while routing the net.

In some embodiments, using the LPM value of the timing path to perform at least one of placement, routing, or optimization of the timing path comprises computing a routing feasibility indicator based on the LPM value, wherein the routing feasibility indicator indicates an amount of routing congestion that is expected to occur while routing the IC design.

In some embodiments, using the LPM value of the timing path to perform at least one of placement, routing, or optimization of the timing path comprises computing a timing feasibility indicator based on the LPM value, wherein the timing feasibility indicator indicates whether or not the timing path is expected to meet a timing constraint for the timing path.

In some embodiments, using the LPM value of the timing path to perform at least one of placement, routing, or optimization of the timing path comprises assigning a priority level to a net in the timing path based on the LPM value, wherein a router prevents detours and prevents demotion to lower performance layers while routing nets in the IC design that have a high priority level.

In some embodiments, using the LPM value of the timing path to perform at least one of placement, routing, or optimization of the timing path comprises selecting a size of a buffer in the timing path based on the LPM value.

DETAILED DESCRIPTION

Figure 1:
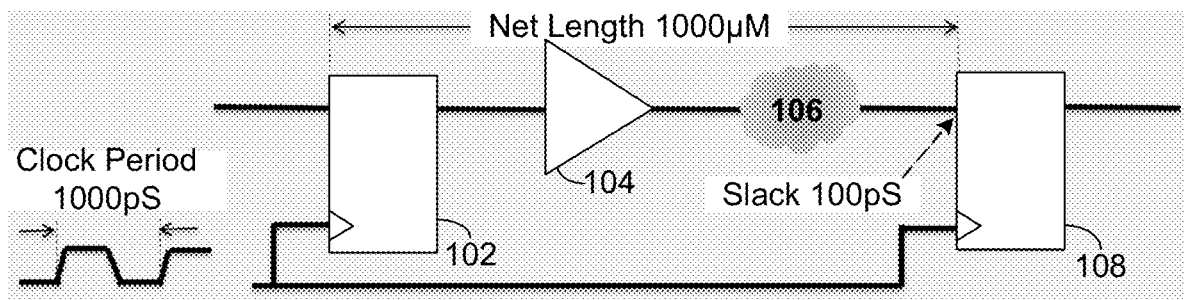
FIG. 1 illustrates how LPM can be calculated in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of IC Design and Manufacturing

An IC design and manufacturing process produces IC chips. IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results.

An IC design can be represented by using different data formats or languages as the IC design progresses through an IC design flow, wherein the different data formats or languages represent the IC design at different levels of abstraction. In general, higher levels of abstraction contain fewer details of the IC design than lower levels of abstraction. Typically, the IC design is described at a high level of abstraction in the early stages of the IC design flow, and the level of abstraction becomes progressively lower as the IC design moves through the IC design flow (the description of the IC design becomes more specific as the IC design progresses through the IC design flow).

For example, toward the beginning of the IC design flow, an IC design can be described at a high level of abstraction by using a hardware description language (HDL) which describes the functionality of the IC design but does not include information about the actual geometric shapes that will be printed on the wafer. Toward the end of the IC design flow, the same IC design can be represented in a low level of abstraction by using a data format or language such as GDSII or OASIS, which contains a description of the actual geometric shapes that are to be printed on the wafer. In between the two ends of the IC design flow, the IC design may be represented in numerous data formats or languages that describe the same IC design at different levels of abstraction.

Some examples of IC design steps and the associated software tools are described below. These examples are for illustrative purposes only and are not intended to limit the embodiments to the forms disclosed. This disclosure describes embodiments that can be used in one or more IC design steps.

IC design software tools enable IC designers to describe the functionality that the IC designers want to implement. These tools also enable IC designers to perform what-if planning to refine functionality, check costs, etc. During logic design and functional verification, the HDL, e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence (i.e., equivalence checking) with the RTL design and/or HDL code.

During design planning, an overall floorplan for the chip can be constructed and analyzed for timing and top-level routing. During physical implementation, circuit elements can be positioned in the layout and can be electrically connected.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

As mentioned above, the HDL code can be translated to a netlist during synthesis. A netlist describes a network of logical building blocks (e.g., AND gates, OR gates, MUXs, etc.) that implement the desired functionality of the IC design. After the synthesis stage, the IC design flow can perform placement, during which the network of logical building blocks is implemented by using a network of cells. A cell represents an actual portion of the physical IC chip that will be created when the IC design is manufactured. Placement involves assigning a physical location to each cell in the IC design. After placement, the IC design flow can perform routing, which involves determining routes for metal wires to electrically connect the placed cells.

A netlist is a list (or collection) of "nets." Each "net" refers to a set of gates (or cells) whose inputs/outputs are electrically connected. For example, suppose a driver cell drives the inputs of a set of driven cells. In this example, the term "net" can refer to the portion of the netlist that includes the driver cell, the set of driven cells, and the electrical connections (e.g., the network of metal wires) that connect the output of the driver cell and the inputs of the set of driven cells. Each of these steps—synthesis, placement, and routing—is complex and includes multiple sub-steps. During an actual IC design flow, multiple iterations may be required before the IC design converges and meets the desired performance and yield targets.

In this disclosure, the term "optimization" refers to modifications to an IC design that improve a performance metric of the IC design. For example, optimization can refer to one or more modifications that reduce delay, area, dynamic power consumption, and/or leakage power of an IC design. Different types of optimization-related modifications can be performed on an IC design to achieve the desired performance targets. Examples of optimization-related modifications include, but are not limited to, inserting or deleting a buffer in a net, inserting or deleting an inverter in a net, moving a gate in a net to a new location, resizing one or more gates in a net, and replacing a net with another net that performs an equivalent logical function.

Multiple optimization objectives can be minimized in an IC design. For example, an optimization process can begin by optimizing the IC design for timing in which one or more cells are replaced by optimal cell configurations to improve one or more timing metrics, e.g., by reducing the worst negative slack, the total negative slack, etc. Then, the IC design may be optimized for area (this step is also called "area recovery" in conventional design flows in which the total area of the IC design is reduced by reducing the size of the cells without worsening the timing metrics). Finally, the IC design can be optimized to reduce leakage power by replacing cells in the IC design with equivalent cells that have lower power leakage while ensuring that timing metrics are not worsened during this process.

Metal layer (or just "layer" for short) selection, timing, routability, and placement are intricately tied to one another and must be addressed simultaneously and continuously throughout the place and route flow. Some EDA technologies try to predict the performance of a routed design by statistically modeling wiring topology and attempting to predict what layers are assigned to which nets. The more the metal layers vary in width, the less precise the statistical model prediction (and hence the timing and routability). For example, one EDA place-and-route design tool attempts to assign layers to nets in the circuit design to realize static timing closure, for example by using a technique called Global Route Layer Binning (GRLB). However, GRLB for layer assignment, using buckets or bins of layers, is not carried all the way from early placement and into routing, but instead is used just for pre-route timing optimization. The layers that are assigned during pre-route timing optimization are not subsequently used to influence the routing routines. Some embodiments disclosed herein provide techniques to use layer buckets/bins to address both pre-route timing and then influence the routing routines.

Overview

In some of the embodiments disclosed herein, a new metric called "layer performance metric" is used while performing one or more steps in an IC design flow. Specifically, in some embodiments, the LPM can be used for layer assignment for very accurate calculations to determine the minimum required performance of a metal layer for a timing path. In some embodiments, the use of the LPM allows design timing and routing feasibility to be predicted accurately at a very early stage of circuit design (after first placement). When LPM based layer assignment congestion and timing predictions are used, the probability of success in routing and design finishing is very high. The use of LPM reverses the dynamic of routing congestion driving static timing (to static timing driving routing congestion). It is much easier to make large timing changes by altering a floorplan to resolve congestion, than by altering the few percent of the clock frequency available in static timing optimization. In some of the embodiments disclosed herein, the use of LPM allows determination of an absolute known layer or a minimum performance layer during placement that is carried through detail routing and design finishing.

As used herein, the term LPM signifies the ratio of a distance associated with a timing path divided by a delay associated with the timing path. In some embodiment, the LPM is equal to a wire length of a timing path divided by the amount of time a signal uses to traverse the (combinational) logic and wires. Using LPM signal flight time characterization of the fastest repeater in the library, it is possible to assign net layers just after standard cell placement to optimize the balance between timing, congestion, area, and power. A firm net layer assignment after placement can be made with a high level of confidence, long before a design is routed (since the flight time and hence layer assignment is based upon calculations of the wiring in the context of the design and not a statistical guess as is normally done). Maintaining the layer assignment made during placement stages, through routing stages, make the timing and routability correlate much more tightly (from pre-route predictions to routed implementation).

Layer predictability in a placement stage is extremely powerful since routing is a lengthy process. With an LPM based layer assignment in the placement stage, it can be known that it is impossible for a path(s) to meet timing. The feasibility feedback can be given to the user to prompt a floorplan or constraint change very early in the design flow. Timing, power, area, and congestion calculations require a layer assignment to be accurate and useful. LPM layer assignment just after placement is a much more accurate way to choose the layers of the nets in a design. Using layers to adjust signal flight time in addition to sizing cell drive strength and adding repeaters allows enhanced optimization of timing, congestion, power, and area.

LPM

LPM is a way to use the possible flight time capabilities of library repeaters (buffers and inverters) and the technology metal layer performance to accurately predict pre- versus-post route timing and congestion. LPM has many applications including, but not limited to, timing feasibility, floorplan feasibility, and layer assignment. LPM is measured in distance divided by time, which is also the unit for velocity. Therefore, in this disclosure, the term "velocity" is sometimes used to refer to an LPM value.

FIG. 1 illustrates how LPM can be calculated in accordance with some embodiments described herein. FIG. 1 illustrates a net in which a signal is launched from register 102, and then travels through buffer 104 and combinational logic cloud 106, before being captured by register 108. Suppose the path total net length (NL) is 1000 micrometers, and the clock period is 1000 picoseconds. As shown in FIG. 1, the slack time at the input of register 108 is 100 picoseconds, which implies a Time of Arrival (TAr) of 900 picoseconds of clock period consumed by launch, capture and any intervening logic/net delays. In this example, the LPM is calculated as the ratio of NL to TAr, or 1000 micrometers/ 900 picoseconds, that is, 1.11 µM/pS.

Using LPM in IC Design

Figure 2:
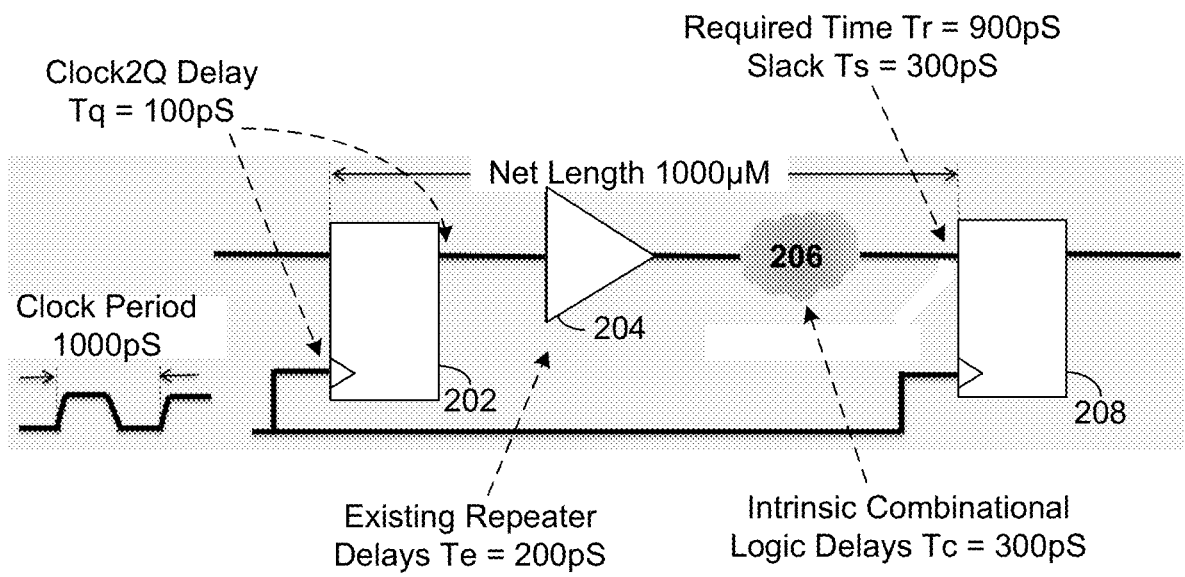
FIG. 2 illustrates how the Minimum Required Velocity (MRV) for a timing path can be calculated in accordance with some embodiments described herein.

FIG. 2 illustrates how the Minimum Required Velocity (MRV) for a timing path can be calculated in accordance with some embodiments described herein. The MRV (which is an LPM value because it is a ratio of a wire length of a timing path and a delay of a timing path) to meet timing is calculated by adding up the delays of the logic in the path without repeaters or wires. FIG. 2 illustrates a net in which a signal is launched from register 202, and then travels through repeater 204 and combinational logic cloud 206, before being captured by register 208. In FIG. 2, the path total NL is 1000 micrometers, for a circuit with a clock period of 1000 picoseconds. The Clock2Q delay (Tq) is the time it takes for the output of register 202 to become stable after the clock edge. The setup time for register 208 is 100 picoseconds, which is reflected in the Required Time (Tr) of 900 picoseconds (which is 100 picoseconds less than the clock period). The timing slack (Ts) at the input of register 208 is 300 picoseconds, which is equal to the difference between the required time (900 picoseconds) and the arrival time (600 picoseconds). The Time Available (TAv) for circuit wires can be approximated with wire RC values set to zero (i.e., by removing wire delays). As shown in FIG. 2, the TAv is equal to 500 picoseconds (to find the TAv in FIG. 2, we add the Te of existing repeaters, i.e., 200 picoseconds, and the slack, i.e., 300 picoseconds, to give us 500 picoseconds). MRV is then calculated as the ratio of NL to TAv, or 1000 micrometers/500 picoseconds, that is, 2.00 uM/pS. If the MRV of a timing path is not met, the signal cannot arrive soon enough at the receiving register. If the MRV of a timing path is not met, then it means that either the timing path nets are too long (i.e., the numerator in the LPM expression is too large), or the performance of the metal layers is not fast enough.

Technologies often cluster layer (widths and RC performance) by horizontal and vertical characteristics. In some of the embodiments disclosed herein, layers are partitioned into "layer buckets" as follows: layers are bundled into partitions based upon their electrical performance (resistance multiplied by capacitance—or RC—per unit length in this case, but width or other parameters could also be used to calculate the electrical performance). If the layers are within a certain RC product percentage of each other (25% in one embodiment) they are paired. At least two adjacent layers (one vertical and one horizontal) are partitioned together.

Figures 3, 4:
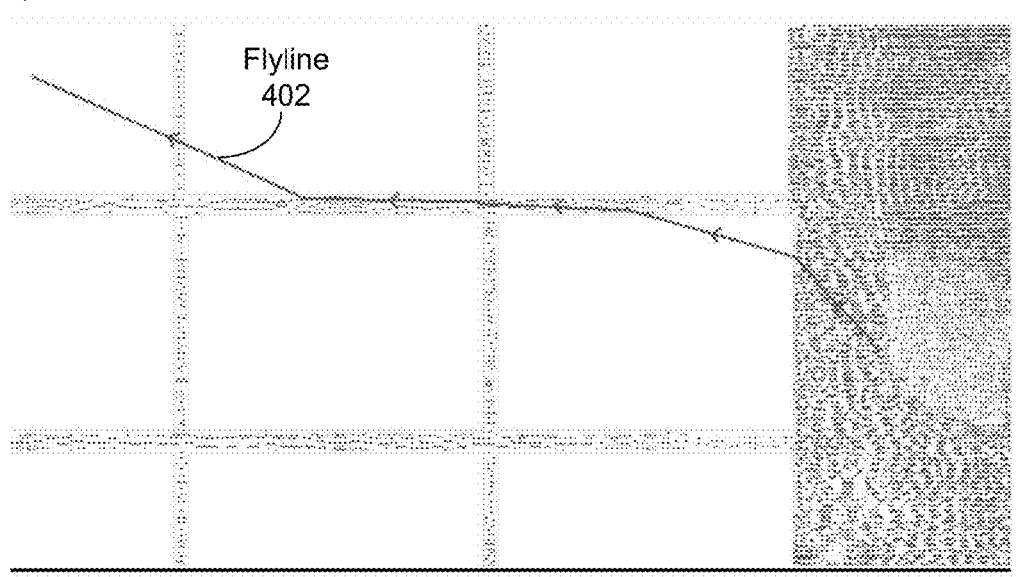
FIG. 3 illustrates how metal layers can be partitioned into layer buckets in accordance with some embodiments described herein.
FIG. 4 illustrates a timing feasibility map that can be generated from the LPM timing estimates in accordance with some embodiments described herein.

FIG. 3 illustrates how metal layers can be partitioned into layer buckets in accordance with some embodiments described herein. In FIG. 3, a technology that has twelve metal layers—i.e., M1 through M12—is partitioned as follows: M1-M2, M3-M4, M5-M6, M7-M8-M9, M10-M11-M12 (five buckets). After layers are partitioned, the partitions are characterized for velocity (as explained below) using a repeater (i.e., a buffer or inverter in most cases).

The Maximum Characterized Velocity (MCV) of a silicon technology is the fastest a signal can travel through a wire with a given metal layer and the (often but not limited to) fastest repeater (typically buffers and inverters) in the library (microns/picosecond for example). Different repeaters and layers yield varying MCV (note that the MCV is an LPM value because it is a ratio of a wire length and a delay). For example, bufferX20 may drive a signal at up to 4 microns/pico-second using layer partition M7-M8-M9 whereas it may only drive a signal up to 2 microns/pico-second on layer partition M3-M4. Using a different drive strength repeater will yield a different LPM value for each layer bucket. The column called "RC" provides the RC value for the metal layer, and the column called "MCV" is the MCV for the layer.

Some embodiments use the following process for metal layer assignment based on LPM: after an initial standard cell placement, layers are assigned to nets in timing paths based upon the electrical performance of different layer buckets. Based upon the wire lengths of the current placement, the slowest possible characterized layer bucket is used to meet timing on each given path. With the layers now assigned, timing and routing congestion can be understood and addressed more accurately than statistical wire assumptions. In addition, since layers are assigned, routing engines can be used to derive congested areas. The congested areas can be resolved with cell placement and routing techniques. As much as possible (unless some other optimization changes the layer assignment) throughout the flow, the layer assignments are maintained through routing.

The MRV (the slowest layer bucket that will allow a path to pass static timing constraints) for each path can be compared against the MCV (the fastest a signal can travel through a wire) of the various layer buckets. If the MRV (minimum required LPM) of the path is known and the MCV (maximum characterized LPM) of each layer bucket is known, then if a layer partition has fast enough LPM the nets in the path can be assigned to the layer partition. This layer bucket assignment will ensure that future optimization can meet static timing constraints.

In existing approaches, layer assignment is typically based upon statistical models. The new LPM-based approach disclosed herein is completely based upon a calculated result that are not a guess. The layer assignments that are performed upfront based on the LPM calculations can be carried through a fully detailed routed design. Existing place-and-routing circuit design tools do not carry early layer assignment through final routing, which causes poor correlation between pre-and-post route timing and congestion.

Once the timed nets are assigned to layer buckets, a global route of the design will yield a feasibility of the current floorplan and standard cell placement. If the design is congested, the design will not meet timing with the given floorplan and standard cell placement. This reverses a paradigm where routing congestion drives timing optimization. Timing optimization techniques generally recover much less timing than floorplan changes. Identifying floorplan changes very early is extremely powerful to users.

FIG. 4 illustrates a timing feasibility map that can be generated from the LPM timing estimates in accordance with some embodiments described herein. This allows users to have timing feedback long before the design is optimized. The flylines (lines depicting timing path pin connections) shown in FIG. 4 have infeasible timing. Different color flylines can depict various severities of timing violations. The visual indicators shown in FIG. 4 are only one way to display the LPM based timing information, as other methods of highlighting the data are possible, and will be evident to a person having ordinary skill in the art.

Some embodiments provide techniques for minimum net velocity (MNV) based buffering (note that MNV is an LPM value). When computing the MRV of a path, the nets in the path must achieve a composite velocity that is as fast as the MRV or faster for a path to meet timing. In one embodiment, a bottleneck analysis or mathematical solver is used to determine the combination of net velocities (called MNVs) that results in the least amount of layer promotion possible to achieve path timing (across all paths in a design). The less the nets are constrained to higher performance layers (via lower velocities), the less routing congestion results (depending on physical context of course). Once a set of MNV are decided upon for every timed net (anytime, but specifically useful at initial placement), the combination of design repeaters and layer performance factors can be used to speed up the net to achieve the MNV constraints. If all nets meet their MNV constraint (whether in a pre-or-post routing step), the timing of the design is met (if, of course, the design timing is feasible with the current placement). The MNV provides correlation of timing throughout the design flow, from pre-to-post routing stages.

The MNV can also be used to drive priority of routing nets during the routing stages (global route, track assign, or detailed route). The higher the MNV of the net, the more important it is to route without detour. Also, the MNV could be fed back into the standard cell placement engine to aid in resolving timing and congestion concerns.

Figure 5:
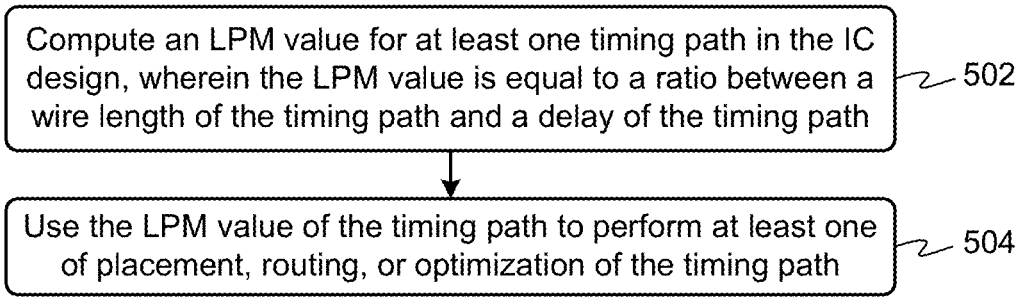
FIG. 5 illustrates a process for using LPM in IC design in accordance with some embodiments described herein.

FIG. 5 illustrates a process for using LPM in IC design in accordance with some embodiments described herein. The process can begin by computing an LPM value for at least one timing path in the IC design, wherein the LPM value is equal to a ratio between a wire length of the timing path and a delay of the timing path (step 502). Next, the process can use the LPM value of the timing path to perform at least one of placement, routing, or optimization of the timing path (step 504).

Some embodiments can assign a set of metal layers to a net in the timing path based on the LPM value, wherein a router uses the set of metal layers while routing the net. Specifically, in some embodiments, the process can compute a minimum LPM value for the timing path (e.g., the MRV value described in reference to FIG. 2), and select the set of metal layers with a characteristic LPM (e.g., the characteristic LPM values described in reference to FIG. 3) greater than or equal to the minimum LPM value that was computed for the timing path. In some embodiments, a minimum LPM can be used to represent the set of metal layers. For example, in FIG. 3, if the minimum LPM is 3.0, then it represents the set of metal layers M5-M12 because layers M5-M12 have characteristic LPM values (i.e., MCV values) that are greater than or equal to 3.0.

In some embodiments, the metal layers in the IC design can be partitioned into layer buckets based on their electrical performance. Next, a characteristic LPM can be calculated for each layer bucket. In these embodiments, a set of layer buckets can be assigned to a net in the timing path that have a characteristic LPM value that is greater than the minimum LPM value that is required to meet a timing constraint of the timing path.

Once a set of metal layers are assigned to the net, the remainder of the IC design flow, i.e., placement, routing, optimization, etc. use the assigned set of metal layers. Note that this approach is very different from current IC design flows in which metal layer assignment is typically performed during routing, which occurs after placement and timing optimization.

Some embodiments can compute a routing feasibility indicator based on the LPM value, wherein the routing feasibility indicator indicates an amount of routing congestion that is expected to occur while routing the IC design. Specifically, the process can assign metal layers or metal layer buckets to nets based on computing the LPM for timing paths. Next, the process can perform global routing by using the assigned layers or layer buckets. A routing feasibility indicator can then be determined based on the amount of congestion in the global routing solution.

Some embodiments can compute a timing feasibility indicator based on the LPM value, wherein the timing feasibility indicator indicates whether or not the timing path is expected to meet a timing constraint for the timing path. In some embodiments, the MRV for a timing path can be calculated as described in reference to FIG. 2. Next, a timing feasibility indicator can be determined based on comparing the MRV with the characteristic LPM of the metal layers. In particular, if none of the metal layers have an LPM that is greater than the MRV, then it is not possible for timing to be met.

Some embodiments can assign a priority level to a net in the timing path based on the LPM value, wherein a router prevents detours while routing nets in the IC design that have a high priority level. Specifically, an LPM value can be determined for each net, wherein a higher LPM value corresponds to a higher priority level. Next, during routing, the router can try to route higher priority nets without any detours and without any demotion to lower performance layers (to the extent it is possible to route the nets in this manner).

Some embodiments can select a size of a buffer in the timing path based on the LPM value. Recall that different combination of buffer sizes and metal layers result in different LPM values for the metal layers. Therefore, once the minimum LPM value for a timing path is known, it is possible to select a metal layer and the corresponding buffer size that will have an LPM value that is greater than or equal to the minimum LPM value that is required for the timing path. In this manner, the LPM value that is computed for a timing path can determine the size of the buffer that is required to be used in the timing path to meet timing.

Computer System

Figure 6:
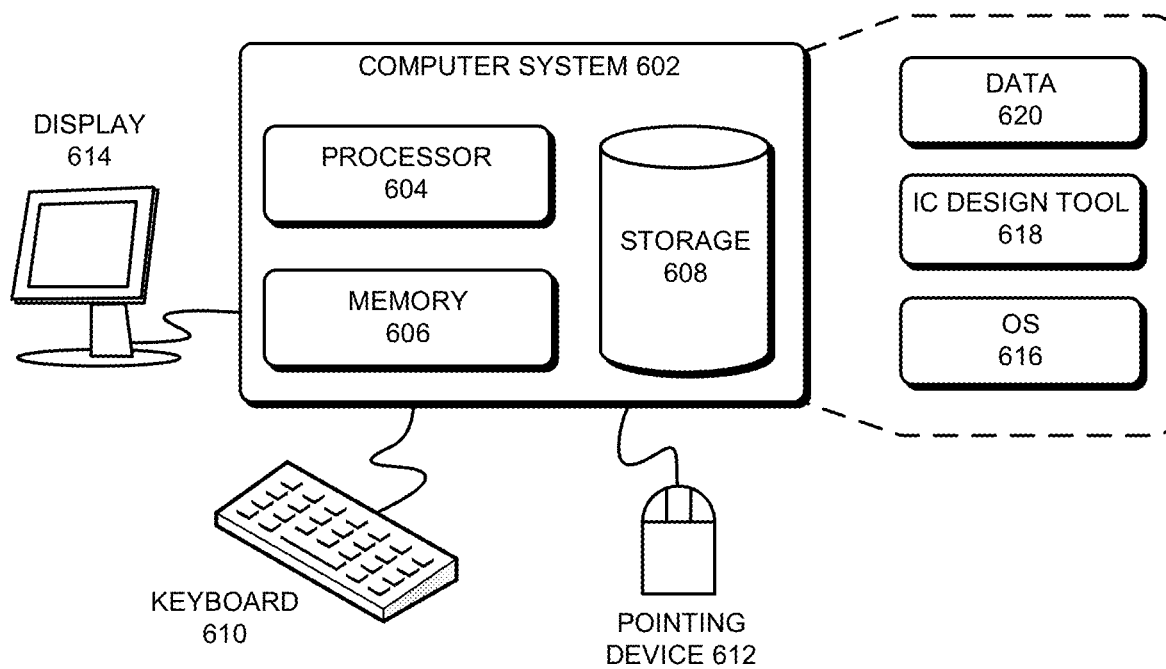
FIG. 6 illustrates a computer system in accordance with some embodiments described herein.

FIG. 6 illustrates a computer system in accordance with some embodiments described herein. The term "computer" or "computer system" generally refers to a hardware-based system that can perform computations required for the design and manufacture of ICs. Computer system 602 can include processor 604, memory 606, and storage device 608. Computer system 602 may include multiple processors, and processor 604 may include multiple cores. Specifically, memory locations in memory 606 can be addressable by processor 604, thereby enabling processor 604 to access (e.g., via load/store instructions) and manipulate (e.g., via logical/floating point/arithmetic instructions) the data stored in memory 606. Computer system 602 can be coupled to display device 614, keyboard 610, and pointing device 612. Storage device 608 can store operating system 616, IC design tool 618, and data 620. Data 620 can include input required by IC design tool 618 and/or output generated by IC design tool 618.

Computer system 602 may automatically (or with user help) perform one or more operations that are implicitly or explicitly described in this disclosure. Specifically, computer system 602 can load IC design tool 618 into memory 606, and IC design tool 618 can then be used to compute LPM values for one or more nets in the IC design, and use the LPM values to perform placement, optimization, and/or routing on an IC design. The resulting IC chips have better performance, manufacturing yield, and/or quality because placement, optimization, and/or routing was performed on the IC design by using LPM values as described herein.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions that, when executed by a computer, cause the computer to perform a method for using a layer performance metric (LPM) during integrated circuit (IC) design, the method comprising:
  computing an LPM value for at least one timing path in the IC design, wherein the LPM value is equal to a ratio between a wire length of the timing path and a delay of the timing path; and
  using the LPM value of the timing path to perform at least one of placement, routing, or optimization of the timing path.

2. The non-transitory computer-readable storage medium of claim 1, wherein using the LPM value of the timing path to perform at least one of placement, routing, or optimization of the timing path comprises assigning a set of metal layers to a net in the timing path based on the LPM value, wherein a router uses the set of metal layers while routing the net.

3. The non-transitory computer-readable storage medium of claim 1, wherein using the LPM value of the timing path to perform at least one of placement, routing, or optimization of the timing path comprises computing a routing feasibility indicator based on the LPM value, wherein the routing feasibility indicator indicates an amount of routing congestion that is expected to occur while routing the IC design.

4. The non-transitory computer-readable storage medium of claim 1, wherein using the LPM value of the timing path to perform at least one of placement, routing, or optimization of the timing path comprises computing a timing feasibility indicator based on the LPM value, wherein the timing feasibility indicator indicates whether or not the timing path is expected to meet a timing constraint for the timing path.

5. The non-transitory computer-readable storage medium of claim 1, wherein using the LPM value of the timing path to perform at least one of placement, routing, or optimization of the timing path comprises assigning a priority level to a net in the timing path based on the LPM value, wherein a router prevents detours and prevents demotion to lower performance layers while routing nets in the IC design that have a high priority level.

6. The non-transitory computer-readable storage medium of claim 1, wherein using the LPM value of the timing path to perform at least one of placement, routing, or optimization of the timing path comprises selecting a size of a buffer in the timing path based on the LPM value.

7. A method for using a layer performance metric (LPM) during integrated circuit (IC) design, the method comprising:
  computing, by using a computer, an LPM value for at least one timing path in the IC design, wherein the LPM value is equal to a ratio between a wire length of the timing path and a delay of the timing path; and
  using the LPM value of the timing path to perform at least one of placement, routing, or optimization of the timing path.

8. The method of claim 7, wherein using the LPM value of the timing path to perform at least one of placement, routing, or optimization of the timing path comprises assigning a set of metal layers to a net in the timing path based on the LPM value, wherein a router uses the set of metal layers while routing the net.

9. The method of claim 7, wherein using the LPM value of the timing path to perform at least one of placement, routing, or optimization of the timing path comprises computing a routing feasibility indicator based on the LPM value, wherein the routing feasibility indicator indicates an amount of routing congestion that is expected to occur while routing the IC design.

10. The method of claim 7, wherein using the LPM value of the timing path to perform at least one of placement, routing, or optimization of the timing path comprises computing a timing feasibility indicator based on the LPM value, wherein the timing feasibility indicator indicates whether or not the timing path is expected to meet a timing constraint for the timing path.

11. The method of claim 7, wherein using the LPM value of the timing path to perform at least one of placement, routing, or optimization of the timing path comprises assigning a priority level to a net in the timing path based on the LPM value, wherein a router prevents detours and prevents demotion to lower performance layers while routing nets in the IC design that have a high priority level.

12. The method of claim 7, wherein using the LPM value of the timing path to perform at least one of placement, routing, or optimization of the timing path comprises selecting a size of a buffer in the timing path based on the LPM value.

13. An apparatus, comprising:
  a processor; and
  a non-transitory computer-readable storage medium storing instructions that, when executed by a computer, cause the computer to perform a method for using a layer performance metric (LPM) during integrated circuit (IC) design, the method comprising:
    computing an LPM value for at least one timing path in the IC design, wherein the LPM value is equal to a ratio between a wire length of the timing path and a delay of the timing path; and
    using the LPM value of the timing path to perform at least one of placement, routing, or optimization of the timing path.

14. The apparatus of claim 13, wherein using the LPM value of the timing path to perform at least one of placement, routing, or optimization of the timing path comprises assigning a set of metal layers to a net in the timing path based on the LPM value, wherein a router uses the set of metal layers while routing the net.

15. The apparatus of claim 13, wherein using the LPM value of the timing path to perform at least one of placement, routing, or optimization of the timing path comprises computing a routing feasibility indicator based on the LPM value, wherein the routing feasibility indicator indicates an amount of routing congestion that is expected to occur while routing the IC design.

16. The apparatus of claim 13, wherein using the LPM value of the timing path to perform at least one of placement, routing, or optimization of the timing path comprises computing a timing feasibility indicator based on the LPM value, wherein the timing feasibility indicator indicates whether or not the timing path is expected to meet a timing constraint for the timing path.

17. The apparatus of claim 13, wherein using the LPM value of the timing path to perform at least one of placement, routing, or optimization of the timing path comprises assigning a priority level to a net in the timing path based on the LPM value, wherein a router prevents detours and prevents demotion to lower performance layers while routing nets in the IC design that have a high priority level.

18. The apparatus of claim 13, wherein using the LPM value of the timing path to perform at least one of placement, routing, or optimization of the timing path comprises selecting a size of a buffer in the timing path based on the LPM value.

* * * * *